United States Patent
Kretsch

(10) Patent No.: US 12,063,887 B2
(45) Date of Patent: Aug. 20, 2024

(54) METHOD AND SYSTEM FOR CONTROLLING WEEDS

(71) Applicant: Lake Restoration, Inc., Rogers, MN (US)

(72) Inventor: Kevin R. Kretsch, Wayzata, MN (US)

(73) Assignee: Lake Restoration, Inc., Rogers, MN (US)

( * ) Notice: Subject to any disclaimer, the term of this patent is extended or adjusted under 35 U.S.C. 154(b) by 1057 days.

(21) Appl. No.: 16/947,352

(22) Filed: Jul. 29, 2020

(65) Prior Publication Data

US 2022/0030768 A1 Feb. 3, 2022

(51) Int. Cl.
*A01D 44/00* (2006.01)
*A01D 34/40* (2006.01)
*A01D 34/404* (2006.01)

(52) U.S. Cl.
CPC ........... *A01D 44/00* (2013.01); *A01D 34/404* (2013.01)

(58) Field of Classification Search
CPC ..... A01D 44/00; E04H 4/1654; A61G 7/1005
See application file for complete search history.

(56) References Cited

U.S. PATENT DOCUMENTS

| | | | | |
|---|---|---|---|---|
| 2,949,003 A | * | 8/1960 | Wilcox | A01D 44/00 56/8 |
| 3,295,231 A | * | 1/1967 | David | A01D 44/00 56/8 |
| 3,407,577 A | * | 10/1968 | Fiske | A01D 44/00 56/8 |
| 3,599,354 A | * | 8/1971 | Larson | A01B 39/18 56/8 |
| 4,137,693 A | * | 2/1979 | Thompson | A01D 44/00 56/8 |
| 4,202,155 A | * | 5/1980 | Stewart | A01D 44/00 56/9 |
| 4,583,353 A | * | 4/1986 | Shaver | A01D 44/00 56/8 |
| 5,079,905 A | * | 1/1992 | Bergstrom | A01D 44/00 56/8 |
| 5,305,585 A | * | 4/1994 | Cousineau | A01D 44/00 56/8 |
| 5,359,835 A | * | 11/1994 | Majkrzak | A01B 29/045 56/8 |
| 5,372,001 A | * | 12/1994 | Olson | A01D 44/00 56/8 |

(Continued)

FOREIGN PATENT DOCUMENTS

| | | | | |
|---|---|---|---|---|
| CN | 109258087 A | * | 1/2019 | |
| RO | 108285 B1 | * | 4/1994 | A01D 44/00 |
| WO | WO-9950508 A1 | * | 10/1999 | E02F 3/88 |

*Primary Examiner* — Alicia Torres
*Assistant Examiner* — Ashley A Kaercher
(74) *Attorney, Agent, or Firm* — Schwegman Lundberg & Woessner, P.A.

(57) ABSTRACT

A weed control system for a body of water can include a rotatable vertically oriented shaft mounted proximate the body of water; an elongate horizontally oriented support member mounted to the vertically oriented shaft and suspended over the water; a rake suspended from the support member by a flexible line; and an oscillating motor for rotating the vertically oriented shaft and the elongate support member such that the rake moves in a repeating pattern through the body of water.

20 Claims, 7 Drawing Sheets

(56) References Cited

U.S. PATENT DOCUMENTS

| | | | |
|---|---|---|---|
| 5,511,366 A * | 4/1996 | Roth | A01D 44/00 56/8 |
| 7,000,372 B2 * | 2/2006 | Kretsch | A01D 44/00 56/8 |
| 2003/0136096 A1 * | 7/2003 | Kretsch | A01D 44/00 56/8 |
| 2003/0172634 A1 * | 9/2003 | Hay | A01D 44/00 56/8 |
| 2005/0097872 A1 * | 5/2005 | Shonnard | A01D 44/00 56/8 |
| 2006/0117652 A1 * | 6/2006 | Kretsch | A01D 44/00 47/1.43 |
| 2007/0199290 A1 * | 8/2007 | Main, Jr. | A01D 44/00 56/8 |
| 2022/0030768 A1 * | 2/2022 | Kretsch | A01D 44/00 |

* cited by examiner

METHOD AND SYSTEM FOR CONTROLLING WEEDS

FIELD OF THE INVENTION

This invention relates to the field of weed control, and more specifically to a method and apparatus for removing and controlling weeds in a body of water.

BACKGROUND

Weeds and plants grow in and along the shores of most lakes and ponds. Many owners of homes and cabins along shorelines enjoy using the shallow portions of the lakes for swimming, boat launching, and other water activities. The weeds are a nuisance and interfere with such activities.

Removing the weeds manually using rakes or other tools is a labor-intensive task. Bulky, mechanical weed harvesters are not practical for private, individual use, while chemical treatments my be unsatisfactory from an environmental perspective.

SUMMARY

One embodiment includes a weed control system for a body of water, the system includes a rotatable vertically oriented shaft mounted proximate the body of water; an elongate horizontally oriented support member mounted to the vertically oriented shaft and suspended over the water; a rake suspended from the support member by a flexible line; and an oscillating motor for rotating the vertically oriented shaft and the elongate support member such that the rake moves in a repeating pattern through the body of water.

DETAILED DESCRIPTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

Figure 1:
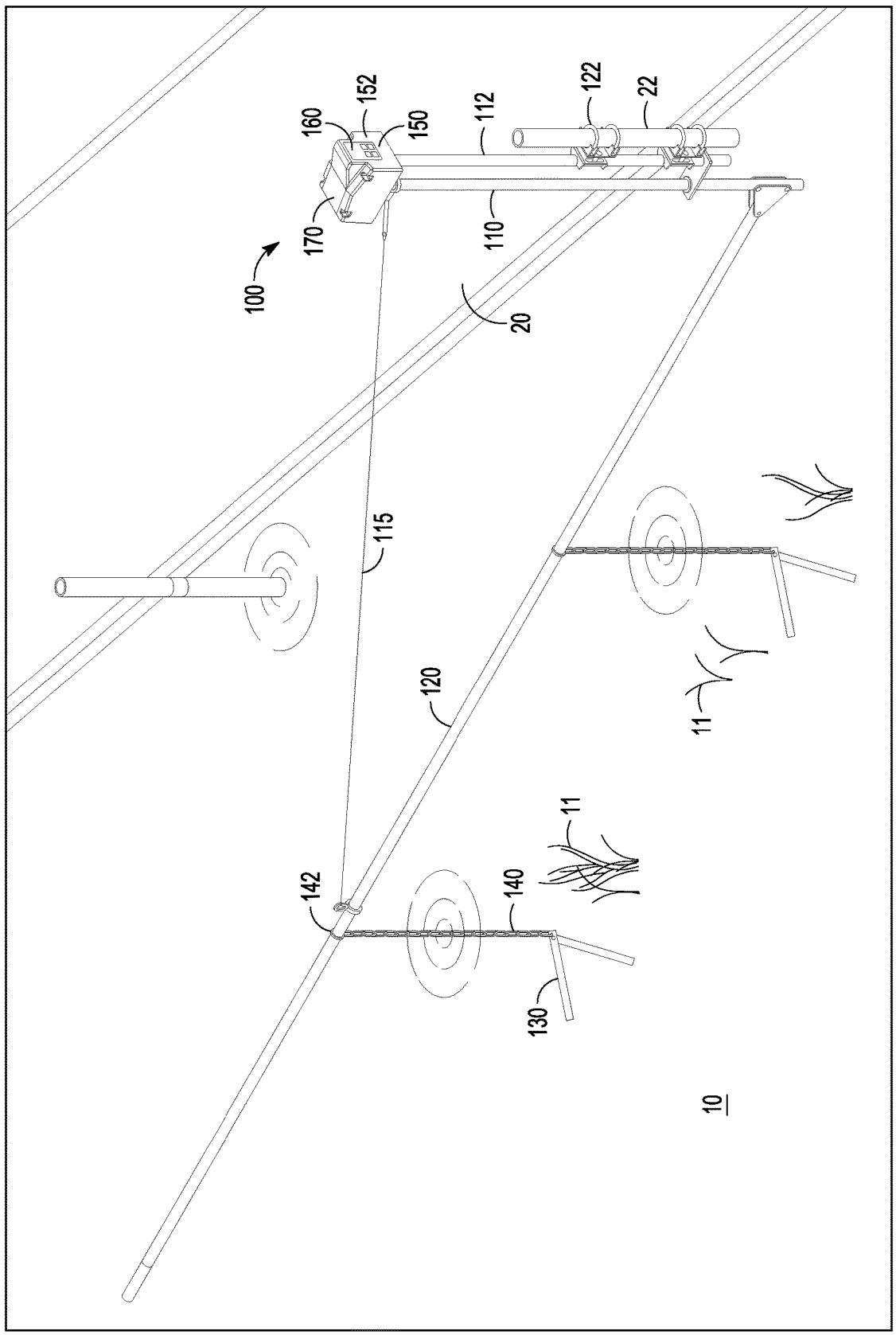
FIG. 1 show a perspective view of a weed control system according to one embodiment.
Figure 2:
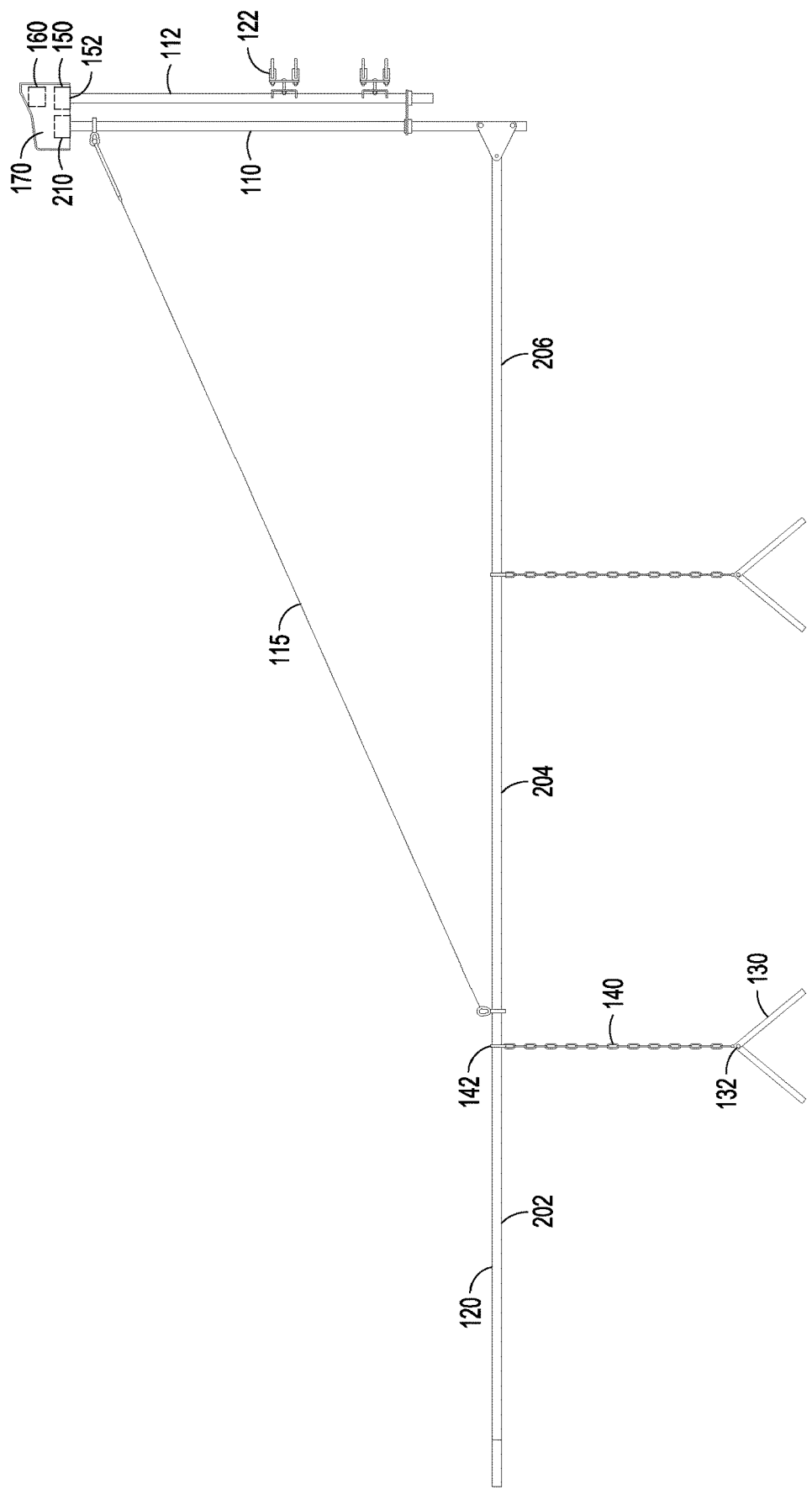
FIG. 2 shows a side view of portions of the weed control system, according to one embodiment.
Figure 3:
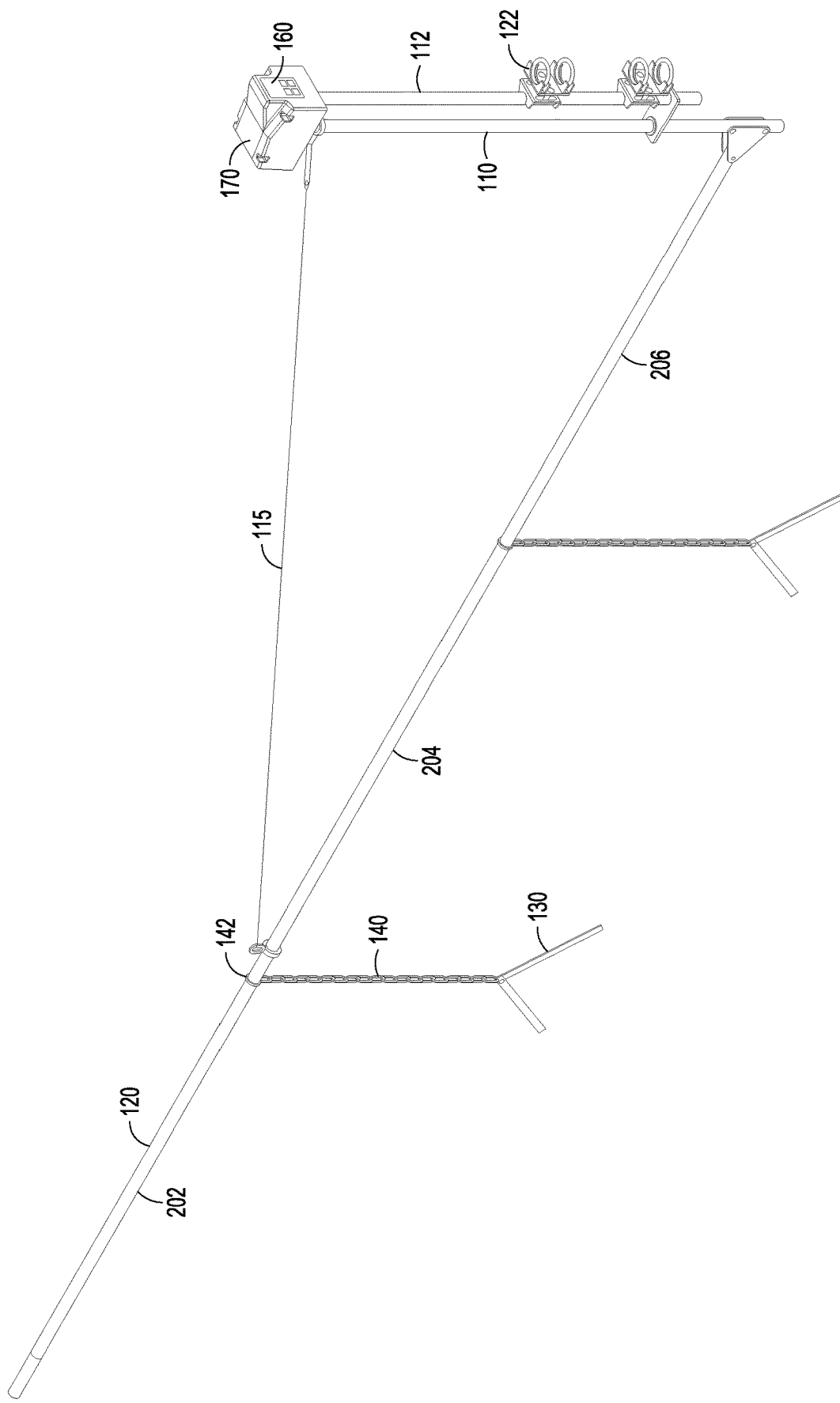
FIG. 3 shows a perspective view of the weed control system according to one embodiment.

FIG. 1 show a perspective view of a weed control system 100 according to one embodiment. FIGS. 2 and 3 show further details of the system 100, with FIG. 2 showing a side view of portions of the weed control system 100, and FIG. 3 showing a perspective view of the weed control system 100. In general, the weed control system 100 is used for controlling weeds in a body of water 10. The weed control system can include a rotatable vertically oriented shaft 110 configured to be mounted proximate the body of water 10, for example, to dock 20. For example, the system can include a support post 112 that is mounted to the dock 20 at a dock support post 22 using one or more clamps 122.

The system 100 further can include an elongate horizontally oriented support member 120 mounted to the vertically oriented shaft 110 and suspended over the water 10. The system is configured such that the horizontal support member 120 is not touching the water 10 and is not buoyantly supported by the water 10. In one example, the horizontal support member 120 can be cantilevered from the vertically oriented shaft 110 and can be further supported by one or more suspension cables 115 attached to the vertically oriented shaft 110. In an example, the suspension cable 115 can be attached to an upper part of the vertically oriented shaft 110 and extends out and attaches to a middle portion of the horizontal support member 120 using eyehooks or other attachments.

In various examples, the horizontal support member 120 can be an elongate shaft made of metal, aluminum, or PVC pipe, or fiberglass, etc. As will be explained further below, since the horizontal support member 120 does not touch or ride upon the water, the member 120 can be driven by a relatively smaller motor than existing systems, which typically have to push a cross-bar through the water. This allows for a light-weight system relative to existing systems since the force of being driven through the water can be high and calls for a more robust system. Thus, the present system can be very light weight. This makes it easier for a user to install and maintain, and the system is less expensive since a very small motor and light weight parts can be used.

In one example, the horizontal support member 120 can include one or more elongate members 202, 204, 206 that can be coupled together end-to-end so that the overall length of the horizontal support member 120 can be varied as needed by the user. In one example, the members 202, 204, 206 can be approximately 5-8 feet long and can be connected together using connectors or by being directly attached to each other. This makes the present device easy to install, uninstall, modify, and easy to move to a different location as needed. As discussed, not much force is needed to move the support member 120 over the water. Accordingly, the support member 120 can be extended a great distance over the water.

System 100 further includes a rake, such as a cutting rake 130, suspended from the support member 120 by a flexible line 140. For example, the flexible line 140 can be a chain that clips to the support member 120 with clips 142. In one example, the clips 142 can be configured to adjustably slide along the support member 120 as needed for varying weed coverage. The flexible line 140 can be about 5 feet long and can be adjustable based on the depth of the area being treated. In one example, a stiff bar hangs down from the support member 120 and attaches with a short flexible line to the cutting rake 130. Such a configuration is useful for a rake 130 that is positioned closet to the shaft 110, so that the cutting rake 130 doesn't drift out of line while being moved through the water, for example. In one example, the cutting rake 130 can be a V-shaped rake attached to the flexible line 140 at a tip 132 of the V such that sharp outer blades of the cutting rake 130 cut weeds 11. As the cutting rake 130 is pulled through the water, the cutting rake 130 has a generally horizontal orientation as it goes through the water 10 or the cutting rake 130 can lie flat on the bottom of the body of water. The sharp outer blades of the cutting rake 130 face the weeds 11 as the cutting rake 130 passes through the weeds 11 and are then able to cut the weeds.

The system further includes an oscillating system to move the cutting rake 130 back and forth over any weeds in the body of water 10. The oscillating system can generally include the support post 112 that can be attached to the dock support post 22. The support post is attached to a control box 170. The control box 170 encloses a gearmotor which includes an oscillating motor 150 and a gear box 152 which drives a gear 210. The gear 210 turns the vertically oriented shaft 110, which in turn rotates the horizontal support member 120 back and forth due to the attachment between the shaft 110 and the support member 120.

The control box 170 further includes a controller 160 to control the actions of the motor 150. The controller 160 can be any combination of hardware and software to perform the needed control of the oscillating motor 150. As will be discussed further below, the controller 160 can be programmed to allow for certain rotating speeds and certain lengths of rotation to allow for different combinations of dock shapes and weed locations. In this example, the support post 112 can be rigidly attached to the dock support post 22 by the clamps 122 so that the support post 112 does not rotate.

As noted, the oscillating motor 150 and gear box 152 are used for rotating and moving the vertically oriented shaft 110 and the elongate support member 120 such that the cutting rake 130 moves in a repeating pattern through the body of water 10 and such that the cutting rake 130 repeatedly contacts and cuts any weeds in a path of the cutting rake 130. Repeatedly contacting the weeds with the rake gradually eliminates the vegetation and enables less horsepower to be used. Heavy and aggressive weed control devices that remove weeds with a single pass would require significantly more horsepower. As noted above, the cutting rake 130 is pulled approximately flat on the bottom of the body of water 10 to engage and cut any weeds in the contacting member's 130 path.

Figure 4:
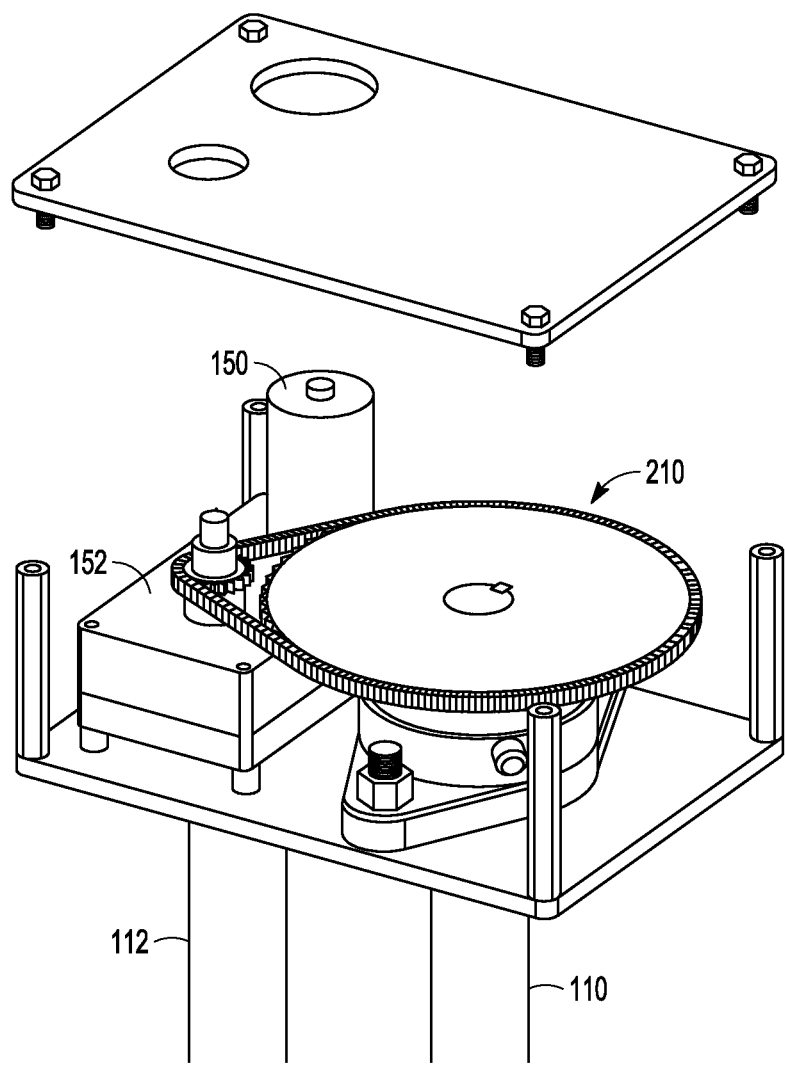
FIG. 4 shows an exploded perspective view of a motor and gear system for the weed control system, according to one embodiment.

FIG. 4 shows further details of an embodiment of the gearmotor system for the present weed control system. As shown in FIG. 2, the gearmotor system includes the oscillating motor 150 attached to a gear box 152 and mounted within the control box 170 attached to the top of the support post 112. The gear box 152 drives the gear 210 which in turn drives the vertically oriented shaft 110.

In various embodiments a very small motor can be used for the system because of the lightweight nature of the system since the there is no water resistance on the support member 120, as opposed to system using a support member that floats or glides through the water and is supported by the water. For example, the oscillating motor 150 can have a power of ¼ HP or less. The motor can be a small geared DC motor. In other examples, the oscillating motor 150 can have a power of between 0.02 to 0.05 HP. In some embodiments, the oscillating motor 150 can have a power of about 1/27 hp. The gear 210 is chosen to allow for the small power motor 150 to drive the shaft 110 with a low speed but higher torque. In one example, the gear ratio between the gearbox 152 and the gear 210 can be about 9.5:1. The system can be wired to an electrical power source. In one example, since a small motor needs so little power, a solar power panel and solar power system can be utilized. For example, a solar panel can be affixed to the top of the control box 170 and the power fed to the controller 160 and the motor 150.

Figure 5:
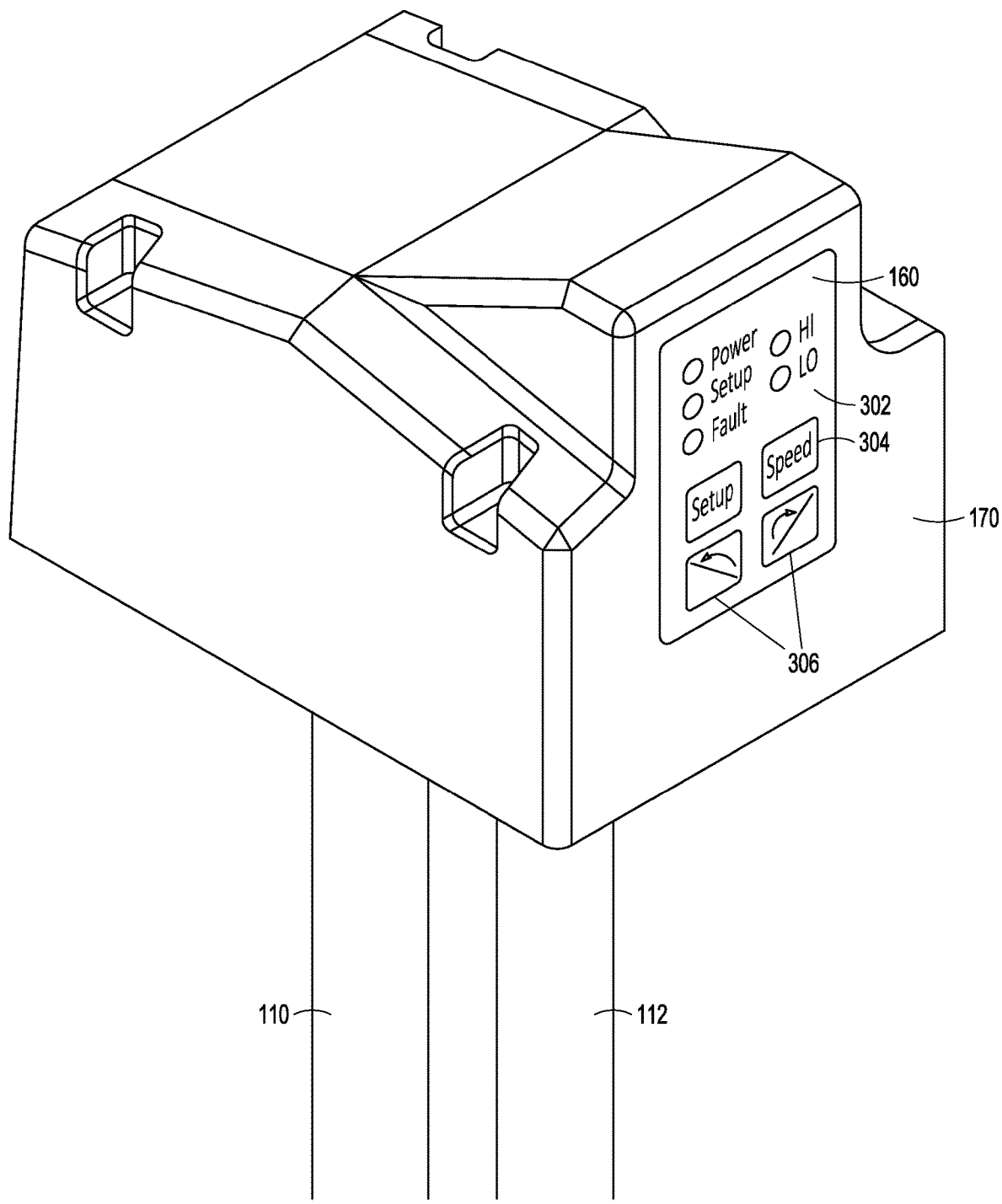
FIG. 5 shows a perspective view of a control box for the weed control system, in accordance with one embodiment.

FIG. 5 shows a perspective view of the control box 170, in accordance with one embodiment. Here the control box holds the controller 160. The controller 160 can be coupled to the motor 150 to control movement of the vertically oriented shaft 110 and the elongate support member 120 and the rake 130. (See FIG. 2) The control box 170 can include an input panel 302 to allow the user to program the controller 160 as needed. For example, the input panel 302 can include a speed input 304 to control a rotational speed of the support member 120. The input panel can include an endpoints input 306 so that the controller 160 can set endpoints where the support member 120 stops in each direction. Thus, the user can control the function of the system as needed depending on weed coverage of the body of water.

In other examples, the controls of the present system can be programmed to vary how the system operates. For instance, the controls can be configured to nestle support member 120 against the dock at the end of an operating cycle. At the end of the 4 hours the unit will complete a cycle that nestles it against the dock. Other operating cycles are within the scope of the present system.

Figure 6:
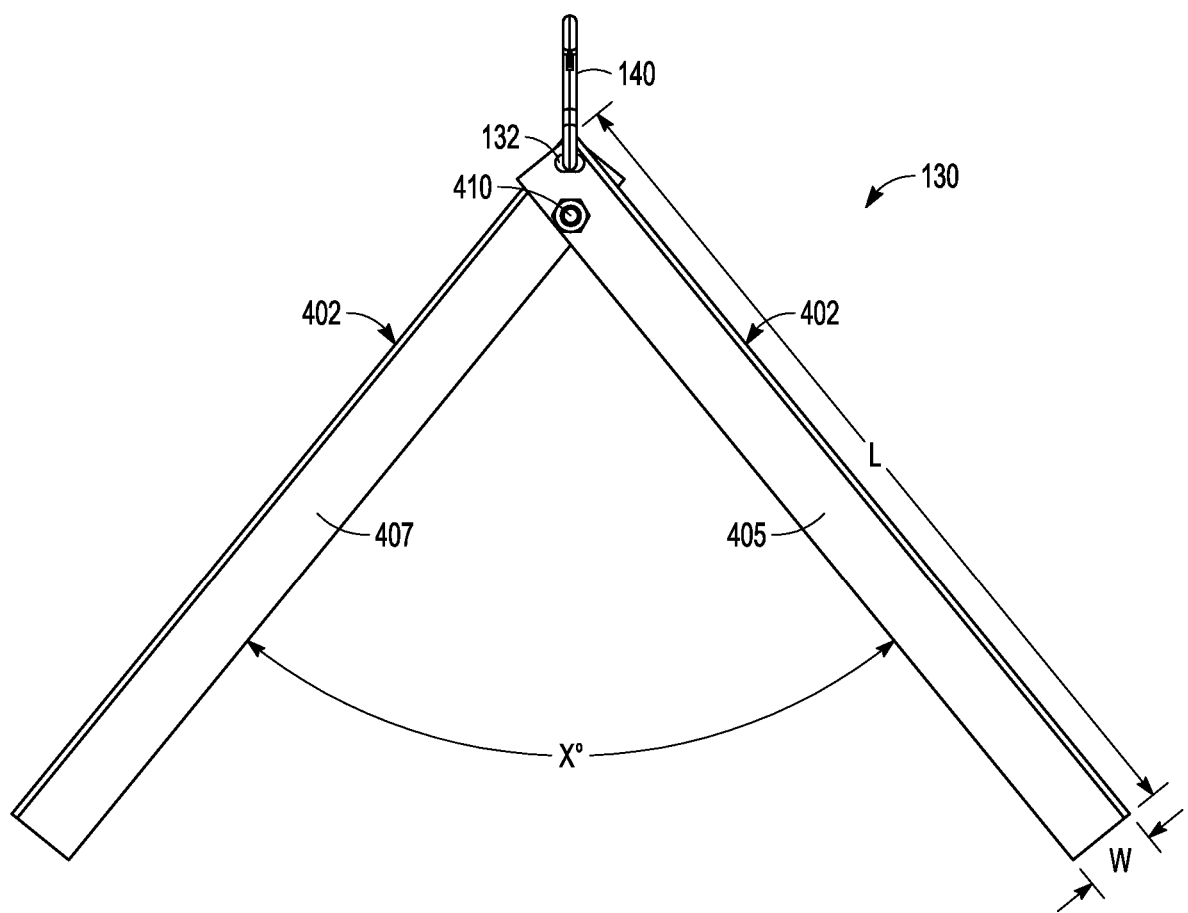
FIG. 6 shows a top view of a rake according to one embodiment.

FIG. 6 shows a top view of the cutting rake 130, according to one embodiment. Here, the cutting rake 130 can be a V-shaped rake. The V-shaped cutting rake 130 includes a pair of arms 405 and 407 pivotally connected at a pivot point 410. Pivot point 410 allows for the angle X between the arms 405 and 407 to be adjusted as needed, depending on the thickness of weeds, for example. Again, the V-shaped rake is attached at the tip 132 of the V-shaped rake to the flexible line 140 such that sharp outer blade edges 402 help cut weeds as the V-shaped cutting rake 130 is pulled on a generally horizontal plane through the water or as the cutting rake 130 glides along the bottom surface of the body of water. By cutting the weeds instead of pulling the weeds out, the system allows for a light torque operation allowing the for the relatively small, inexpensive motor, as noted above.

Figure 7B:
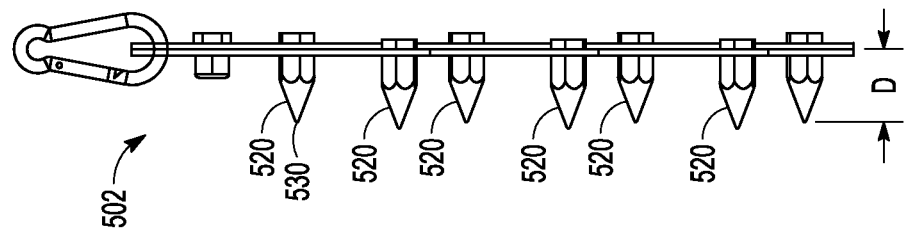
FIG. 7B shows a side view of the rake of FIG. 7A.
Figure 7A:
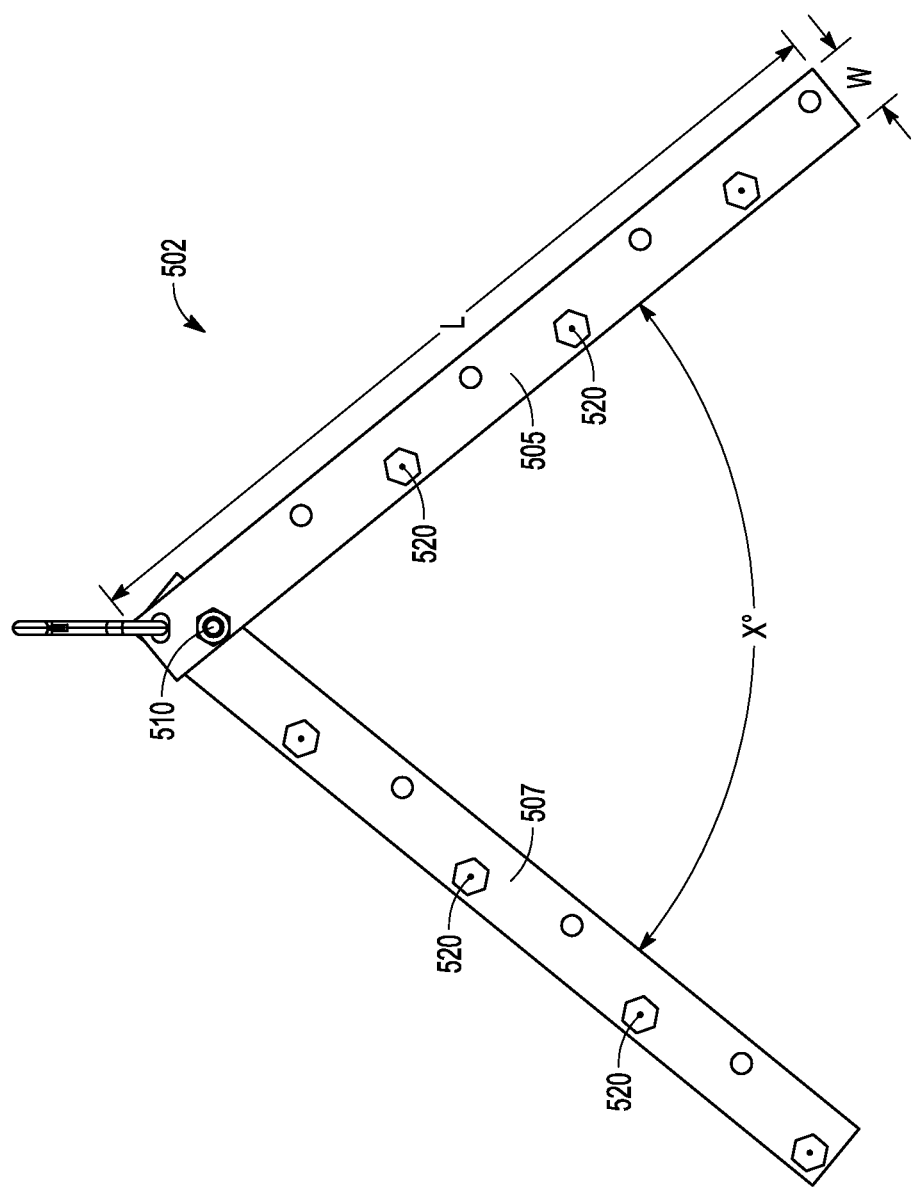
FIG. 7A shows a top view of a rake with tines attached according to one embodiment.

FIG. 7A shows a top view of a rake 502 with tines attached according to one embodiment. FIG. 7B shows a side view of the rake 502. In this example the rake can be a V-shaped rake 502 which includes barbs 520 extending from a pair of arms 505, 507 connected at a rotatable pivot point 510. The barbs 520 can include a sharp point 510. The barbed, V-shaped rake 502 is configured to rake through any silt at the bottom of the body of water. As the rake 520 is pulled generally horizontally over the lake bottom, the barbs 520 can dig into the bottom and rake up and loosen the silt. In typical usage, the rake 502 can be used after the weeds are removed using the cutting rake 130. For example, in one use of the present system, the user first uses the cutting rake 130 to cut the weeds and then uses the rake 502 to maintain the bottom of the body of water. In another example use, the user can remove all the rakes and just let the flexible lines 140 drag across the bottom of the body of water to help maintain the bottom.

Referring again to FIG. 1, a lake blower can further be used with the present system. For example, a lake blower can be separately attached to the dock and positioned to blow any loose weeds and muck away from the bottom of the lake while the system 100 is activated. In one example, the lake blower can be mounted toward the bottom of the vertical post 110 so that the blower rotates along with the support bar 120.

A method of use of the present system to control weeds can include mounting the rotatable vertically oriented shaft 110 proximate the body of water 10; attaching the elongate horizontally oriented support member 120 to the vertically oriented shaft 110 such that the support member 120 is cantilevered over the water; suspending the rake 130 from the support member 120 by the flexible line 140; and moving the support member 120 back and forth using an oscillating motor 150 such that the rake 130 moves in a repeating pattern through the body of water 10 such that the rake 130 repeatedly contacts any weeds in a path of the rake 130.

As noted, the oscillating motor 150 can be relatively small, for example the motor can have a power of between 0.02 to 0.05 HP, or the power of the other horsepower motors discussed above. The method can further include coupling the controller 160 to the motor 150 to control movement of the vertically oriented shaft 110 and the elongate support member 120 and the rake 130. The controller 160 can set endpoints where the support member 120 stops in each direction, and the controller 160 can be set to control a rotational speed of the support member. The controller can include sensor detecting magnets attached to the shaft or gear plate. The sensor detects the magnet and reversing direction based on set points. Other controller methods may be used detect the position of the shaft and reverse the motor.

In use, any number of rakes can be used depending on the size and density of the weed bed. Moreover, the length of the support member 120 can be lengthened or shortened as desired depending on need.

CONCLUSION

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A weed control system for a body of water, the system comprising:
   a rotatable vertically oriented shaft mounted proximate the body of water;
   an elongate horizontally oriented support member mounted to the vertically oriented shaft and suspended over the water, wherein the support member is cantilevered from the vertically oriented shaft;
   a rake suspended from the support member by a flexible line; and
   an oscillating motor and gears for rotating the vertically oriented shaft and the elongate support member such that the rake moves in a repeating pattern through the body of water.

2. The weed control system of claim 1, wherein the support member is further attached to the vertically oriented shaft by suspension cables.

3. The weed control system of claim 1, wherein the oscillating motor has a power of ¼HP or less.

4. The weed control system of claim 3, wherein the oscillating motor has a power of between 0.02 to 0.05 HP.

5. The weed control system of claim 4, wherein the oscillating motor has a power of about 1/27 hp.

6. The weed control system of claim 1, wherein the support member includes a plurality of tube segments connected together.

7. The weed control system of claim 1, wherein the rake is a V-shaped cutting rake including sharpened outer edges.

8. The weed control system of claim 1, wherein the rake includes barbs extending from the rake and configured to rake through any silt at the bottom of the body of water.

9. The weed control system of claim 1, wherein the flexible lines include chains.

10. The weed control system of claim 1, wherein the rake includes a plurality of interchangeable rakes including a V-shaped rake with sharped edges to cut weeds and a barbed weed rake configured to rake silt.

11. The weed control system of claim 1, including a controller coupled to the motor to control movement of the vertically oriented shaft and the elongate support member and the rake.

12. The weed control system of claim 11, wherein the controller can set endpoints where the support member stops in each direction.

13. The weed control of claim 11, wherein the controller can be set to control a rotational speed of the support member.

14. A method to control weeds for a body of water, the method comprising:
   mounting a rotatable vertically oriented shaft proximate the body of water;
   attaching an elongate horizontally oriented support member to the vertically oriented shaft such that the support member is cantilevered over the water;
   suspending a rake from the support member by a flexible line; and
   moving the support member back and forth using an oscillating motor such that the rake moves in a repeating pattern through the body of water such that the rake repeatedly contacts any weeds in a path of the rake.

15. The method of claim 14, wherein the oscillating motor has a power of between 0.02 to 0.05 HP.

16. The method of claim 14, wherein the rake is an adjustably sized V-shaped cutting rake have sharpened edges.

17. The method of claim 14, wherein the rake includes barbs extending from a V-shaped rake and configured to rake through any silt at the bottom of the body of water.

18. The method of claim 14, further including coupling a controller to the motor to control movement of the vertically oriented shaft and the elongate support member and the rake, wherein the controller can set endpoints where the support member stops in each direction, and the controller can be set to control a rotational speed of the support member.

19. A weed control system for a body of water, the system comprising:
   a vertically oriented shaft mounted proximate the body of water;
   an elongate horizontally oriented support member mounted to the vertically oriented shaft and suspended over the water, wherein the support member is cantilevered from the vertically oriented shaft;
   a rake attached to the support member and extending downward towards a bottom of the body of water; and
   a drive member configured for rotating the elongate horizontally oriented support member such that the rake moves in a repeating pattern through the body of water.

20. The weed control system of claim 19, wherein the support member is further attached to the vertically oriented shaft by a suspension cable.

* * * * *